DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 1, 1974

927 O.G. 8

T927,004

BITUMINOUS COATING HYDROXYL TERMINATED POLYBUTADIENE

Gary L. Statton, 214 W. Rose Valley Road, Wallingford, Pa. 19086

Continuation of application Ser. No. 302,445, Oct. 31, 1972, which is a continuation of application Ser. No. 149,354, June 2, 1971. This application July 5, 1973, Ser. No. 376,765

Int. Cl. C08g *51/52*

U.S. Cl. 260—28

No Drawing. 9 Pages Specification

A bituminous coating composition prepared from bituminous material, polyisocyanates, polyepoxides and polyols wherein at least a portion of said polyol is a hydroxyl terminated polybutadiene. The resultant coatings are extremely flexible and show improved impact resistance as well as resistance to chemicals and water than recognized epoxy systems. When applied to metals, wood, masonry and concrete, the coatings provide corrosion resistance.